United States Patent [19]

Wu et al.

[11] Patent Number: 5,903,676
[45] Date of Patent: May 11, 1999

[54] CONTEXT-BASED, ADAPTIVE, LOSSLESS IMAGE CODEC

[75] Inventors: Xiaolin Wu, London, Canada; Nasir Memon, De Kalb, Ill.

[73] Assignee: The Chinese University of Hong Kong, New Territories, The Hong Kong Special Administrative Region of the People's Republic of China

[21] Appl. No.: 08/836,438

[22] PCT Filed: Nov. 8, 1995

[86] PCT No.: PCT/CA95/00635

§ 371 Date: Jul. 21, 1997

§ 102(e) Date: Jul. 21, 1997

[87] PCT Pub. No.: WO96/15620

PCT Pub. Date: May 23, 1996

[30] Foreign Application Priority Data

Nov. 10, 1994 [GB] United Kingdom .................. 9422738

[51] Int. Cl.$^6$ ...................................................... G06K 9/36
[52] U.S. Cl. ........................ 382/244; 382/232; 382/237; 341/51
[58] Field of Search ..................................... 382/238, 232, 382/237, 239, 244, 247, 233, 240; 358/430

[56] References Cited

U.S. PATENT DOCUMENTS 4,870,695  9/1989  Gonzales et al. ......................... 382/56
5,023,611  6/1991  Chamzas et al. ......................... 341/51
5,432,871  7/1995  Novik ..................................... 382/61
5,539,842  7/1996  Schwartz ............................... 382/232
5,550,540  8/1996  Furlan et al. ........................... 341/51

FOREIGN PATENT DOCUMENTS 0 547 528 A1  6/1993  European Pat. Off. .
0 613 290 A1  8/1994  European Pat. Off. .

OTHER PUBLICATIONS

P.E. Tisher et al., "Context–Based Lossless Image Compression," *The Computer Journal*, vol. 36, No. 1, 1993, pp. 68–77.

*Primary Examiner*—Kim Yen Vu
*Assistant Examiner*—Jimmy D. Nguyen
*Attorney, Agent, or Firm*—Townsend and Townsend and Crew LLP; Kenneth R. Allen

[57] ABSTRACT

An encoding/decoding method is provided for lossless compression of digital pictures of all types, including continuous-tone images, graphics, multimedia images of mixed text, graphics and photographs, binary documents and drawings. Continuous-tone mode and binary mode are identified on a pixel-by-pixel basis. In continuous-tone mode, context modeling and prediction are employed involving mostly integer arithmetic and simple logic in a conceptually sophisticated scheme. Both the encoding and decoding techniques are suitable for sequential and progressive transmission, although different specific algorithms may be employed for the different specific cases.

23 Claims, 5 Drawing Sheets

- NEIGHBORING PIXELS
- GRADIENT-ADJUSTED PREDICTION I

CONTEXT-BASED, ADAPTIVE, LOSSLESS IMAGE CODEC

The present application claims partial priority of British Provisional Patent Application Serial No. 9422738-6 filed Nov. 10, 1994.

BACKGROUND OF THE INVENTION

With rapidly-advancing computer, telecommunication, and digital imaging technologies, there is an astronomical amount of image data for a wide range of applications such as education, entertainment, medical imaging, space exploration, electronic publishing, visual arts, etc. This rapid growth of image data puts punishing burdens on computer storage and visual communication bandwidth. Thus image compression becomes a pressing technical challenge in visual communications and computing, without which it will be difficult to build, deploy, and use cost-effective multimedia information systems.

Lossless compression is a form of compression where an image can be reconstructed without any loss of information. Lossless image compression is required by medical imaging, satellite/aerial imaging, image archiving, preservation of precious art work and documents, the press, or any applications demanding ultra high image fidelity. Furthermore, lossless image coding is the necessary last step of many lossy image compression systems, such as lossless compression of codeword indices in vector quantization (VQ), and lossless compression of transform coefficients in Discrete Cosine Transform (DCT) and wavelet/subband-based coding.

There exists a large body of literature on lossless image compression algorithms and systems, such as the IBM Q-coder, and JPEG lossless coder. Among notable patents and publications are the US patents and research publications listed below:
U.S. Pat. No. 4,463,342 1984 IBM.
U.S. Pat. No. 4,749,983 07/1988 Langdon.
U.S. Pat. No. 4,969,204 11/1989 Melnychuck et al.
U.S. Pat. No. 5,050,230 09/1990 Jones et al.
Universal Modeling and Coding—J. Rissanen and G. Langdon, 1981, IEEE, vol. IT-27.
A Universal Data Compression System—J. Rissanen, 1983, IEEE, vol. IT-29.
Parameter Reduction and Context Selection for Compression of the Gray-Scale Images—S. Todd, G. Langdon, and J. Rissanen, 1985, IBM J. Res. & Develop., vol. 29.
Comparing the Lossless Image Compression Standards and Universal Context Modelling—R. Arps, M. Weinberger, T. Truong, and J. Rissanen, Proc. of the Picture coding Symposium, Sacramento, September 1994.
On the JPEG Model for Lossless Image Compression—G. Langdon, A. Gulati, and E. Seiler, Proc. of 1992 Data Compression Conf.
New Methods for lossless Image Compression Using Arithmetic Coding—P. Howard and J. Vitter, 1992, Info. Proc. & Manag., vol. 28.

The currently achievable lossless compression ratio is still modest, being typically from 1.5:1 to 2.5:1. For instance, in contrast to the success of JPEG's lossy compression standard, the current JPEG's lossless compression standard has sufficiently poor coding efficiency that it is seldom used in practice.

In 1994, ISO and JPEG solicited for proposals for the next international standard for lossless image compression. The present invention is a result of the inventors' response to the ISO solicitation. The lead inventor Xiaolin Wu, developed a context-based, adaptive, lossless image coding and decoding technique (herein CALIC). Among nine proposals that were submitted to ISO for its initial evaluation as candidates for the lossless image compression standard in 1995, the present CALIC system ranked first according to a criterion that accounts for both coding efficiency and algorithm simplicity.

EP A 0 613 290 entitled METHOD AND APPARATUS FOR BINARY IMAGE DATA COMPRESSION published on Aug. 31, 1994 describes a method and apparatus for lossless compression of binary images only. The abstract and specification of EP A 0 613 290 mention that the method and apparatus are applicable to "photographs" and "mixed binary images". However, it is apparent that the photographs referred to are digitally half-toned photographs and not true continuous toned images. The method and apparatus of EP A 0 613 290 only encode binary image data and d o not provide for compression of continuous tone images, graphics, or mixtures of binary images with continuous tone images, and graphics.

EP A 0 547 528 entitled METHOD AND ASSOCIATED APPARATUS FOR ENCODING BIT PLANES published on Jun. 23, 1993 describes a scheme for lossless image compression by bit-plane encoding. Bit plane encoding has significant known disadvantages.

P. E. Tischer et al. Context-based Lossless Image Compression 8199 The Computer Journal vol. 36 no. 1 pp. 68–77 (1993) provides a general academic treatment of the subject of context based lossless image compression.

Known prior art on lossless compression of continuous-tone images is based on the principle of predictive coding. An image is traversed, and pixels are encoded in a fixed order, typically in raster scan sequence. Previously encoded pixels that are known to both the encoder and the decoder are used to predict the upcoming pixels. The prediction errors rather than the pixels themselves are entropy encoded by Huffman or like arithmetic coding. The original image is reconstructed by adding the error term back to the prediction value. The predictive coding works because the histogram of the errors is much more concentrated (heavily biased toward 0) than the histogram of the pixel values, resulting in a significantly smaller zero-order entropy for the former than for the latter. Among numerous prediction schemes in the literature, the simplest type is a fixed linear predictor such as those used under the current lossless JPEG standard.

A linear predictor can be optimized on an image-by-image or even block-by-block basis via linear regression. However, such an optimization is expensive and brings only modest improvement in coding efficiency. Moreover the performance of linear predictors is not robust in the areas of edges. Adaptive, non-linear predictor can adjust parameters according to the local edge strengths and orientations, if edges exist. The adjustment of predictor parameters can be made very efficient since it is based on local information.

Historically, lossless image compression inherited the theoretical framework and methodology of text compression. Statistical modeling of the source being compressed plays a central role in any data compression systems. Suppose that we encode a finite source $x_1, x_2, \ldots, x_n$ sequentially. The optimal code length of the sequence in bits is then $$-\log \prod_{i=0}^{n-1} p(x_{i+1} \mid x_i, \ldots, x_1), \tag{1}$$

given the assignments of conditional probabilities. Arithmetic coding can approach this code length of the source. The challenge is to assign the conditional probabilities $p(x_{\{i+1\}}|x_i, \ldots, x_1)$ to maximize the product given above, hence minimize the code length. The achievable compression is governed by a scheme, or a model, that can assign high conditional probability distributions $p(x_{\{i+1\}}|x_i, \ldots, x_1)$ to the given sequence.

Fitting a given source well with statistical models is a difficult and computationally very expensive task. Context modeling of continuous-tone images is made even more difficult by the large alphabet size ($\geq 256$) of grey-scale images. Context modeling of the source symbols (pixel values) would lead to an unwieldily large number of possible model states (contexts). This is more than a problem of high time and space complexities for modeling. If the number of model parameters is too large with respect to the image resolution, there will be insufficient samples to obtain good estimates of conditional probabilities on the model states, leading to poor coding efficiency. This is known as a "context dilution problem." This problem was theoretically formulated by Rissanen in the framework of stochastic complexity as the "model cost." Rissanen's work proves that the high complexity of a model can reduce coding efficiency, as observed by many data compression practitioners. What is needed are innovative algorithmic techniques to reduce the model complexity for improving both coding and computational efficiency.

SUMMARY OF THE INVENTION

According to the invention, an encoding/decoding method is provided for lossless (reversible) compression of digital pictures of all types, including continuous-tone images, graphics, multimedia images of mixed text, graphics photographs, and binary documents and drawings. Continuous-tone mode and binary mode are identified on a pixel-by-pixel basis. In continous-tone mode, context modeling and prediction are employed, involving mostly integer arithmetic and simple logic in a conceptually sophisticated scheme. Both the encoding and decoding techniques are suitable for sequential and progressive transmission, although different specific algorithms may be employed for the different specific cases. The system is symmetric, meaning that the encoder and decoder have the same time and space complexities.

A primary reason for the improved coding efficiency by context modeling of errors and error feedback lies in the fact that the prediction error sequence is a composition of multiple sources of distinct underlying statistics. The use of proper contexts to separate the statistically distinct sources of errors from the code stream can get a significant reduction in conditional entropies.

The invention will be better understood by reference to the following detailed description in connection with the accompanying drawings.

DESCRIPTION OF SPECIFIC EMBODIMENTS

Basic compression System

Figure 1:
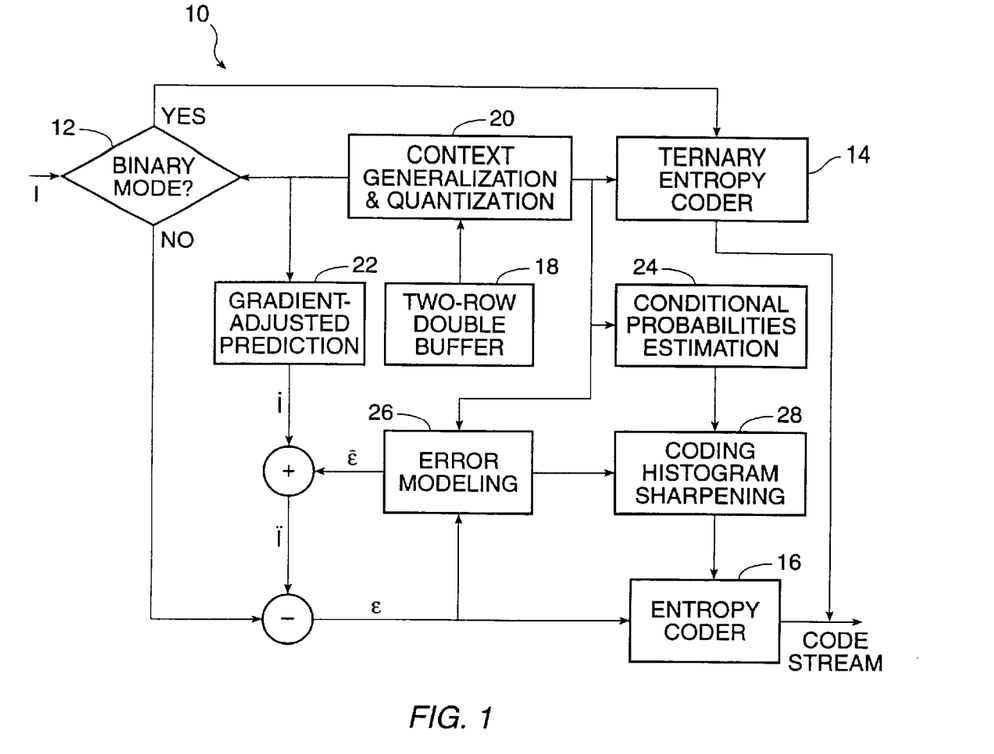
FIG. 1 is a schematic description of an encoding process for compression according to the invention in which the decoding process is a reverse.

Referring to FIG. 1, before actual compression, a system 10 operating according to the invention includes a decision maker 12 which dynamically selects on parts of the image between a compression scheme for continuous-tone image data and a compression scheme for binary image data based on context of the pixel data. In binary mode, the image data is compressed by a first encoder 14 using context-based, adaptive, ternary entropy encoding. In the continuous-tone mode, the image data is compressed by a second encoder 16 using context-based, adaptive, non-linear predictive coding. Before encoding or decoding an image, the system is designed to provide or selects between sequential transmission and progressive transmission, to encode or decode image data by the appropriated types of context-sensitive entropy-encoding and decoding processors. Image data encoded and decoded in raster scan order in a single pass through the image is preferably transmitted by sequential transmission. The coding process uses prediction contexts that involve only the previous two or three scan lines of coded pixels. Consequently, the encoding and decoding processes require only a simple double buffer 18 that holds only the two or three rows of pixels that immediately precede the current pixel. (Where greater buffer space is available, the system can achieve progressive transmission via interlaced subsampling that encodes, and accordingly decodes, an image in four passes.)

In coding a picture, the CALIC system dynamically operates in two modes: binary and continuous-tone modes. The binary mode is for the situation in which the current locality of interest in the input image has no more than two distinct intensity values; hence it is designed for a more general class of images or subimages than the class of black-and-white images.

An innovation of the system is to distinguish between binary and continuous-tone types of pictures on a local, rather than a global, basis. The system automatically selects one of the two modes depending on the context of the current pixel. In the binary mode, the context-based adaptive entropy coder 14 is used to code three symbols, including an escape symbol. This distinction between binary and continuous-tone modes is important because the coding methodologies are very different in the two modes, and it contributes to the universality and robustness of the CALIC system over a wide range of pictures, including those that mix texts, graphics and photographs in multimedia applications.

The selection between the continuous-tone and binary modes is based on pixel context. The mode selection is automatic and completely transparent to the user. No side information about mode switching is required. The coded image only needs a header of five bytes: two for width, two for height, and one for depth or the number of bits in intensity resolution.

In the continuous-tone mode, a mechanism 20 is provided to compress pixel values by context-based, adaptive, predictive coding. To predict the current pixel value, a predictor 22 is provided for a local intensity gradient to be estimated based on the neighboring pixels in horizontal and vertical directions. These estimates are used to detect the magnitude and orientation of edges in the input image so that adjustments can be made to the prediction accordingly. This gradient-adjusted prediction (GAP), denoted by $\dot{I}$, of I is further corrected based on the particular pattern that the neighboring pixels exhibit (as shown here as an output of an error modeling function 26). This is necessary because gradients alone cannot adequately characterize some of the more complex relationships between the predicted pixel and its surroundings. Context modeling can exploit higher-order structures such as texture patterns in the image. This is done by quantizing the neighborhood into different conditioning classes, and estimating the expectation of the GAP prediction error $e = I - \dot{I}$ in each of these classes separately. The reasons for estimating conditional expectations rather than the conditional density functions, as commonly suggested in the literature, are to prevent the problem of context dilution (sample counts are insufficient to obtain good estimates), and to reduce time and space complexities. The conditional error expectation estimate is then fed back to the GAP predictor 22 $\dot{I}$ to generate a second and improved prediction denoted by $\ddot{I}$, which is equal to $\dot{I} + \bar{e}$. The net effect is a context-based, adaptive, non-linear predictor that can correct itself by learning from its mistakes made in the past and in the same context. This is a key feature to distinguish the prediction scheme of the CALIC system from the existing prediction schemes.

The final prediction error $\epsilon = I - \ddot{I}$ is entropy encoded. In driving the entropy coder 16, a modest number (between 8 and 32) of conditional probabilities of prediction errors $\epsilon$ are estimated (by an estimator 24) depending on an estimate of the prediction error energy. The error energy estimator is a linear function of the horizontal and vertical gradient and of the prediction errors at the preceding pixels. It can be optimized off line via linear regression for specific types of images. The conditioning classes for entropy coding are generated by quantizing the error energy estimator. The quantization can also be optimized via off-line dynamic programming to minimize the total code length of a set of training images. In addition, the CALIC system uses a novel and elegant technique to "sharpen" the conditional probabilities (thus reducing underlying entropy) for entropy coding by a simple sign flipping mechanism 28 without any increase in modeling space.

Gradient-Adjusted Predictor

A nonlinear predictor according to the invention adapts itself to the image gradients near the predicted pixel. This predictor improves the robustness of traditional DPCM predictors, particularly in areas of edges. The basic function is now explained.

Denote an input image of width W and height H by I[i,j], $0 \leq i < W$, $0 \leq j < H$. In order not to obscure the concept of the proposed compression algorithm, we only consider in the following development the sequential coding of interior pixels I[i,j], $2 \leq i < W-2$, $2 \leq j < H-2$. Many possible treatments of boundary pixels are possible, and they do not make a significant difference in the final compression ratio due to the small population of boundary pixels. For instance, boundary pixels can be coded by a simple DPCM scheme as they are encountered in the raster scan.

To facilitate the prediction of I[i,j] and entropy coding of the prediction error via context modeling, we compute the following quantities:

$$d_h = |I[i-1, j] - I[i-2, j]| + |I[i, j-1] - I[i-1, j-1]| + \quad (2)$$
$$|I[i+1, j-1] - I[i, j-1]|$$
$$d_v = |I[i-1, j] - I[i-1, j-1]| + |I[i, j-1] - I[i, j-2]| +$$
$$|I[i+1, j-1] - I[i+1, j-2]|.$$

Clearly, $d_h$ and $d_v$ are estimates, within a scaling factor, of the gradients of the intensity function near pixel I[i,j] in horizontal and vertical directions. The values of $d_h$ and $d_v$ are used to detect the magnitude and orientation of edges in the input image, and make necessary adjustments in the prediction. We aim to alleviate the problem that the precision of existing DPCM-type predictors can be adversely affected by edges. In Equations (2) three absolute differences are used for d in each direction. This has been found to give the best compression results. Two or one absolute differences can be used here for lower complexity with a small loss in performance. Efficient incremental and/or parallel schemes for evaluating $d_h$ and $d_v$ are straightforward. For instance, to avoid unnecessary repeated computations, one can store the values of $|I[\cdot,\cdot] - I[\cdot,\cdot]|$ associated with preceding pixels for future reference. This only requires an array of the size W.

For simple denotation in the sequel, we let $$n = I[i, j-1], \ w = I[i-1, j], \ ne = I[i+1, j-1],$$
$$nw = I[i-1, j-1], \ nn = I[i, j-2], \ ww = I[i-2, j] \quad (3)$$

meaning north, west, northeast, northwest, north-north, and west-west, respectively.

Figure 2:
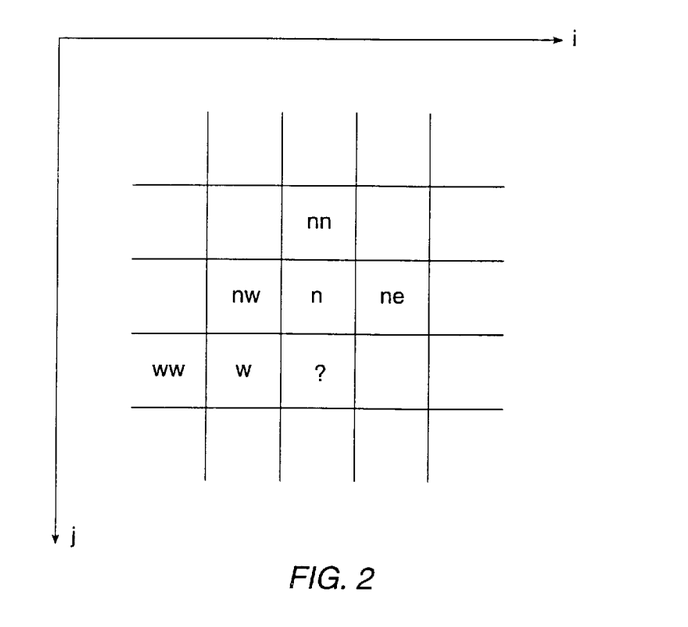
FIG. 2 illustrates labeling of neighboring pixels for context-based prediction and modeling.

The locations of these pixels with respect to I[i,j] are given in FIG. 2.

Based on $d_h$ and $d_v$, a simple technique, as described by the following conditional statements, is used to make a gradient-adjusted prediction (GAP) $\dot{I}$[i,j] of I[i,j].

IF $(d_v - d_h > 80)$ {sharp horizontal edge}
  $\dot{I}[i, j] = w$
ELSE IF $(d_v - d_h < -80)$ {sharp vertical edge}
  $\dot{I}[i, j] = n$
ELSE{
  $\dot{I}[i, j] = (w + n)/2 + (ne - nw)/4;$
  IF $(d_v - d_h > 32)$ {horizontal edge}
    $\dot{I}[i, j] = (\dot{I}[i, j] + w)/2$
  ELSE IF $(d_v - d_h > 8)$ {weak horizontal edge}
    $\dot{I}[i, j] = (3\dot{I}[i, j] + w)/4$
  ELSE IF $(d_v - d_h < -32)$ {vertical edge}
    $\dot{I}[i, j] = (\dot{I}[i, j] + n)/2$
  ELSE IF $(d_v - d_h < -8)$ {weak vertical edge}
    $\dot{I}[i, j] = (3\dot{I}[i, j] + n)/4$
}

The procedure given above is parallelizable. This technique differs from the existing linear predictors in that it weights the neighboring pixels of I[i,j] according to the estimated gradients of the image. In effect, $\dot{I}$[i,j] is a simple, adaptive, nonlinear predictor. The predictor coefficients and thresholds given above were empirically chosen. A major criterion in choosing these coefficients is the ease of computations. For instance, most coefficients are of power of 2 to avoid multiplication and divisions. The multiples of 3 in the procedure above can be computed by a bit shift and an addition.

It is possible, albeit quite expensive, to optimize the coefficients and thresholds for an image or a class of images, so that a norm of the expected prediction error $E\{\|I-\hat{I}\|\}$ is minimized. It is not recommended that such an optimization process to be carried out on an image-by-image basis. However, it is important to point out that the coefficients and thresholds in computing $\hat{I}[i,j]$ can be set by the user, if the user knows the optimal or nearly optimal coefficients and thresholds for the target images.

Error Energy Quantization for Minimum Entropy

Although the nonlinear predictor $\hat{I}[i,j]$ outperforms linear predictors, it does not completely remove the statistical redundancy in the image. The variance of prediction errors $e=I-\hat{I}$ strongly correlates to the smoothness of the image around the predicted pixel $I[i,j]$. To model this correlation at a small computational cost, we define an error energy estimator to be $$\Delta = ad_h + bd_v + c|e_w|, \tag{4}$$

where $d_h$ and $d_v$ are defined in Equation (2) which are reused here to quantify the variability of pixel values, and $e_w = I[i-1,j] - \hat{I}e[i-1,j]$. $|e_w|$ is chosen because large errors tend to occur consecutively. The coefficients a, b, and c can be determined, in an off-line design process, by the standard linear regression technique so that $\Delta$ is the least-squares estimator of the error strength $|e|$ based on $d_h$, $d_v$, $|e_w|$. For algorithm efficiency, we recommend a=b=1 and c=2 in Equation (4). In our experiments we also find that other definitions of $\Delta$ can sometimes estimate the error energy better, such as $$\Delta = a_{min}\{d_h, d_v\} + b_{max}x\{|e_w|, |e_n|\}, \tag{5}$$

depending on images, where $e_n = I[i,j-1] - \hat{I}[i,j-1]$.

By conditioning the error distribution on $\Delta$, we can separate the prediction errors into classes of different variances. Thus entropy coding of errors using estimated conditional probability $p(e/\Delta)$ improves coding efficiency over using $p(e)$. For time and space efficiency, we quantize $\Delta$ to L levels. In practice, L=8 is found to be sufficient. Larger L improves coding efficiency only marginally. Denote the $\Delta$ quantizer by Q, i.e., $Q(\Delta)$ in $\{0,1,\ldots,7\}$. In entropy coding of prediction errors, we estimate and use eight conditional probabilities $p(e|Q(\Delta))$. Since $\Delta$ is a random variable, It requires only scalar quantization. The errors. In an off-line design process, we get a training set of $(e,\Delta)$ pairs from test images, and use the standard dynamic programming technique to choose $0=q_0<q_1<\ldots<q_{\{L-1\}}<q_L=\infty$ to partition $\Delta$ into L intervals such that $$-\sum_{d=0}^{L-1} \sum_{q_d \leq \Delta \leq q_{d+1}} p(e)\log p(e) \tag{6}$$

is minimized.

In practice, we found that an image-independent $\Delta$ quantizer whose bins are fixed, $$q_1=5, q_2=15, q_3=25, q_4=42, q_5=60, q_6=85, q_7=140. \tag{7}$$

worked almost as well as the optimal image-dependent $\Delta$ quantizer.

Estimating L=8 conditional error probabilities $p(e|Q(\Delta))$ requires only a modest amount of memory in the phase of entropy coding of prediction errors. Furthermore, the small number of involved conditional error probabilities means that even small images will provide enough samples for context modeling to learn $p(e|Q(\Delta))$ quickly in adaptive entropy coding.

Context Modeling of Prediction Errors

The precision of the nonlinear GAP predictor $\hat{I}[i,j]$ can be significantly improved via context modeling, because gradients alone cannot adequately characterize some of the more complex relationships between the predicted pixel $I[i,j]$ and its surrounding. Context modeling of the prediction error $e=I-\hat{I}$ can exploit higher-order structures such as texture patterns in the image for further compression gains.

Denote by a K-tuple $C=\{x_0,x_1,\ldots,x_{K-1}\}$ a modeling context of $\hat{I}[i,j]$ that consists of K events $x_i$.

For both space and time efficiencies and to avoid the problem of context dilution, we need to drastically reduce the number of possible contexts C by vector quantization of C. Specifically, we consider a prediction context of eight events $$C = \{x_0, \ldots, x_6, x_7\} = \tag{8}$$
$$\{n, w, nw, ne, nn, ww, 2n-nn, 2w-ww\}$$

and quantize context $C=\{x_0,x_1,\ldots,x_7\}$ to an 8-bit binary number $b=b_7b_6\ldots b_0$ using the prediction value $\hat{I}$ as the threshold, namely $$b_k = \begin{cases} 0 & \text{if } x_k \geq \hat{I}[i,j] \\ 1 & \text{if } x_k < \hat{I}[i,j] \end{cases}, \quad 0 \leq k < K = 8. \tag{9}$$

Figure 3:
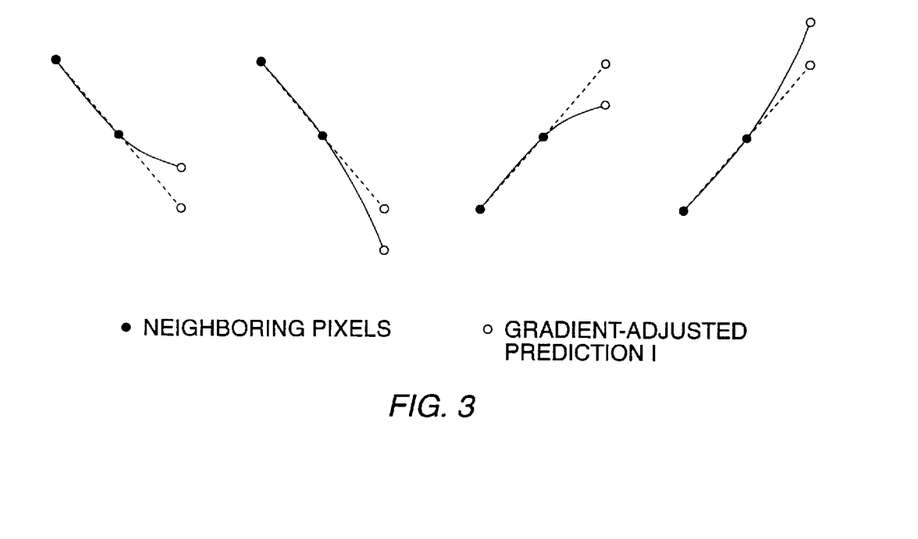
FIG. 3 shows four possible convexity relationships between a GAP predictor I and two neighboring pixels.

Clearly, number B (a binary vector codeword) encodes the texture patterns in the modeling context which are indicative of the behavior of e. Also note that an event $x_i$ in a prediction context need not be a neighboring pixel to $I[i,j]$. It can be a function of some neighboring pixels. By letting $x_6=2n-nn$, $x_7=2w-ww$ in the above, and consequently setting $b_6$ and $b_7$ depending on whether $2n-nn<\hat{I}[i,j]$ and $2w-ww<\hat{I}[i,j]$, we can detect whether the prediction value $\hat{I}[i,j]$ forms a convex or concave waveform with respect to the neighboring pixels in vertical and horizontal directions, as depicted by FIG. 3. This convexity information is useful in the context modeling of e.

Since the variability of neighboring pixels also influences the error distribution, we combine the quantized error energy $0 \leq \lfloor Q(\Delta)/2 \rfloor < L/2$ with the quantized texture pattern $0 \leq B < 2^K$ to form compound prediction contexts, denoted by $C(\lfloor Q(\Delta)/2 \rfloor, B)$. This scheme can be viewed as a product quantization of two independently treated image features: spatial texture patterns and the energy of prediction errors.

At a glance, we would seemingly use $4 \cdot 2^8 = 1024$ different compound contexts, since $0 \leq \lfloor Q(\Delta)/2 \rfloor < L/2 = 4$ and $0 \leq B < 2^K = 2^8$. However, not all $2^8$ binary codewords of B quantizer defined by (9) are possible. If the prediction value $\hat{I}[i,j]$ lies in between n and nn, then the condition $2n-nn<\hat{I}[i,j]$ is either always true or always false. In other words, the outcome of the test $2n-nn<\hat{I}[i,j]$ in (9) is uniquely determined if $n>\hat{I}[i,j]$ and $nn<\hat{I}[i,j]$, or if $n<\hat{I}[i,j]$ and $nn>\hat{I}[i,j]$. This should be apparent from FIG. 3. By referring to (8) and (9), we see that in B, $b_6$ is fixed if $b_2$ and $b_5$ are different. Likewise, $b_7$ is fixed if $b_0$ and $b_4$ are different. Because $b_6$, $b_2$, and $b_5$ are not independent, they can only yield $2 \cdot 2 + 2 \cdot 1 = 6$ combinations. The same holds for $b_7$, $b_0$, and $b_4$. Thus, B represents only $6 \cdot 6 \cdot 4 = 144$ rather than 256 valid texture patterns. Finally, the total number of valid compound contexts in error modeling is only $4 \cdot 144 = 576$.

Th model cost is still to high to estimate $p(e|C(\lfloor Q(\Delta)/2 \rfloor, B))$ for 576 compound contexts. Therefore, we estimate only the conditional expectations $E\{e|C(\delta,\beta)\}$ using the corresponding sample means $\bar{e}(\delta,\beta)$ for different compound contexts. Computing $\bar{e}(\delta,\beta)$ involves only accumulating the error terms in each compound context and maintaining a count on the occurrence of each context. For each compound context $C(\delta,\beta)$, $0 \leq \delta < 4$, $0 \leq \beta < 144$, we count the number $N(\delta,\beta)$ of occurrences of $C(\delta,\beta)$ for the purpose of computing the conditional sample mean $\bar{\epsilon}(\delta,\beta)$. We only use one byte to store the occurrence count. Whenever the count reaches some value $n_{max} < 256$, we scale down the count but let the corresponding $\bar{\epsilon}(\delta,\beta)$ intact. We recommend $n_{max} = 128$.

In order to update $\bar{\epsilon}(\delta,\beta)$ in error modeling, we use an accumulator $S(\delta,\beta)$ of $\epsilon(\delta,\beta)$, and compute $$\bar{\epsilon}(\delta,\beta) = S(\delta,\beta)/N(\delta,\beta) \qquad (10)$$

whenever a compound context $C(\delta,\beta)$ occurs. We use a 16-bit signed integer to store $S(\delta,\beta)$ whose range is more than sufficient in practice. It takes more than 128 consecutive $\bar{\epsilon}(\delta,\beta) = -255$ or $\bar{\epsilon}(\delta,\beta) = 255$ to violate the bounds $-2^{15} < S(\delta,\beta) < 2^{15}$, but we have $n_{max} = 128$. Once $N(\delta,\beta)$ reaches 128, we re-scale the variables by setting $$S(\delta,\beta) = S(\delta,\beta)/2; \; N(\delta,\beta) = 64 \qquad (11)$$

In summary, the coding system needs one byte for $N(\delta,\beta)$ and two bytes for $S(\delta,\beta)$ for each of 576 compound contexts. Thus the total size of the memory required by context modeling of prediction errors can be as small as 1728 bytes.

Besides being a technique to reduce the memory use, rescaling also has the beneficial side effect of aging the observed data. This is an inexpensive way of adapting the context error modeling to time varying sources. Indeed, the scaling technique gave a slightly better compression in our experiments.

Context-based Adaptive Predictor via Error Feedback

The idea of gaining coding efficiency by context modeling of expected errors $E\{e|C(\delta,\beta)\}$ came from the observation that the conditional mean $\bar{e}(\delta,\beta)$ is generally not zero in a given context $C(\delta,\beta)$. This does not contradict the well-known fact that the DPCM prediction error without conditioning on the contexts, follows a Laplacian (symmetric exponential) distribution, hence is zero mean for most continuous-tone images. The Laplacian distribution can be viewed as a composition of distributions of different means and different variances. Context modeling of prediction errors is a means to separate these distributions. Therefore, the more biased is $\bar{e}(\delta,\beta)$ from zero, the more effective is the modeling. Since the conditional mean $\bar{e}(\delta,\beta)$ is the most likely prediction error in a given compound context $C(\delta,\beta)$, we can improve the prediction by feeding back $\bar{e}(\delta,\epsilon)$ and adjusting the prediction $\hat{I}$ to $\hat{I} = \hat{I} + \bar{e}(\delta,\beta)$.

In order not to over-adjust the GAP predictor, we actually consider the new prediction error $\epsilon = \hat{I} - \hat{I}$ rather than $e = I - \hat{I}$ in context-based error modeling. The context modeling of $\epsilon$ in turn leads to an improved predictor for I: $\hat{I} = \hat{I} + \bar{\epsilon}(\delta,\beta)$ where $\bar{\epsilon}(\delta,\beta)$ is the sample mean of $\epsilon$ conditioned on compound context $C(\delta,\beta)$.

Figure 4:
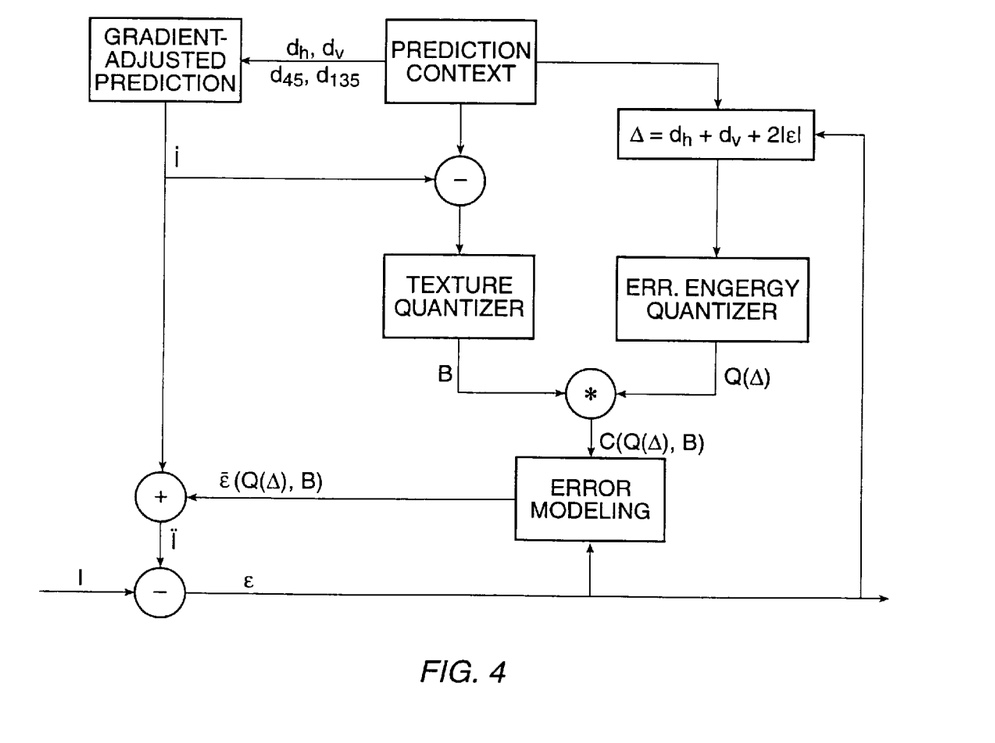
FIG. 4 illustrates a two-stage adaptive prediction scheme via context modeling of prediction errors and error feedback.

Conceptually, we have a two-stage adaptive prediction scheme via context modeling of errors and error feedback. A block diagram of the scheme is given in FIG. 4. In the first stage, the encoder makes a GAP prediction $\hat{I}$ based on $d_h$ and $d_v$. Then $\hat{I}$ is used as a threshold value to quantize a block of neighboring pixels into a spatial texture pattern B as in (9). The encoder also computes the error energy estimator $\Delta$, and quantizes it to $Q(\Delta)$. By a simple Cartesian product of $Q(\Delta)$ and B, a compound context $C(\lfloor Q(\Delta)/2 \rfloor, B) = C(\delta,\beta)$ is formed for context modeling of prediction errors. Algorithmically, $C(\delta,\beta)$ just serves as an index to look up the most likely prediction error $\bar{\epsilon}(\delta,\beta)$ from a table of conditional sample means. In the second stage, $\bar{\epsilon}(\delta,\beta)$ is added to the first prediction $\hat{I}$ to arrive at an adaptive, context-based, non-linear prediction for I[i,j]:

$$\hat{I}[i,j] = \hat{I}[i,j] + \bar{\epsilon}(\delta,\beta). \qquad (12)$$

Finally, the error $\epsilon = I[i,j] - \hat{I}[i,j]$ of the second prediction is entropy coded. Upon receiving $\epsilon$, the decoder can recover I[i,j] via the same adaptive context modeling scheme. After each pixel is encoded/decoded, both the encoder and decoder update $\bar{\epsilon}(\delta,\beta)$ by the most recent observation $\epsilon = I - \hat{I}$ in the current compound context $C(\delta,\beta)$.

Context Hierarchy and context Selection

We call the context C defined by (8) the kernel context. It captures the most of the correlation between the prediction error and the surrounding pixels. However, the kernel context is generally not optimal in the sense of obtaining the minimum description length. The technique introduced in this section is for selecting optimal model contexts in a context hierarchy for gaining maximum compression.

In his algorithm called Context Rissanen proposed a method of choosing optimal modeling contexts by assuming that a one-dimensional data stream like text is generated by a tree model. However, selecting optimal modeling contexts in universal lossless image compression is much more difficult than in universal text compression, because the image signal is not one-dimensional. In order to use the sequential tree model on two-dimensional image data, one has to impose an order on the pixels in a modeling template. This order is required when traversing the tree for selecting the "optimal" context in which the next symbol is coded. However, as a modeling state, a context (causal template) is an integral entity, and should be treated as such. Any ordering of pixels in the causal template is artificial, and the modeling context selected based on this ordering may compromise the coding efficiency.

Figure 5:
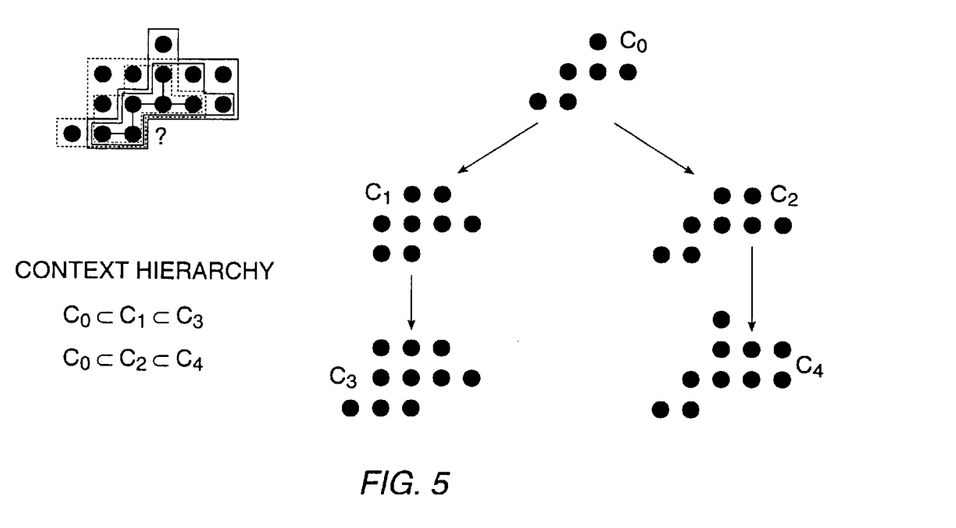
FIG. 5 is a chart depicting a method for determining a possible hierarchy of contexts (causal templates around a coded pixel marked by '?') in which optimal modeling context is selected.

To retain the cohesion and integrity of pixels in a modeling context, we generalize the nodes of the tree model to a two-dimensional causal template, and call the resulting tree model context hierarchy as depicted by FIG. 5. The root of the context hierarchy is the kernel context, denoted by $C_0$.

Given a modeling context $C_0$ that is a set of pixels, we call context $C_1$ an expansion of $C_0$ if $C_1 \supset C_0$. The set containment relation naturally defines a context hierarchy. The nodes of the context hierarchy correspond to nested modeling contexts.

Although the conditional entropy with respect to the error probability density function p(e|C) is monotonically non-increasing in the size of causal template C, larger modeling context does not necessarily give more accurate estimate of $e_i$. Too large a causal template spreads samples too thin into too many contexts to obtain reliable estimates. Intuitively speaking, we want to choose a context as large as possible but provided that it occurred for a sufficient number of times in the past. In principle, Rissanen's algorithm Context can be generalized to the context hierarchy for selecting optimal context. Unfortunately, algorithm Context is impractical, and not suitable for hardware implementation or parallelization. As a practical alternative, we invented the following simple context selection method.

Refer to FIG. 5, we have $C_0$ $C_1$ $C_3$, and $C_0$ $C_2$ $C_4$, where $C_0 = \{n,w,nw,ne,nn,ww,2n\text{-}nn,2w\text{-}ww\}$ is the kernel context. For each context $C_i$, $0 \leq i < 4$, maintain the count $N_i$ of the number of the times that $C_i$ has happened, and keep the sum $S_i$ of the prediction errors under $C_i$, as described in section 4.3. Then the optimal context selection and the corresponding context-based, adaptive, non-linear prediction can be efficiently done by the following simple logic:

$$S_1 = S_r = S_0;$$
$$N_1 = N_r = N_0;$$
$$\{IF\} \ (N_3 > \tau)$$
$$\quad \{S_1 = S_3; N_1 = N_3;\}$$
$$\{ELSE \ IF\} \ (N_1 > \tau)$$
$$\quad \{S_1 = S_1; N_1 = N_1;\}$$
$$\{IF\} \ (N_4 > \tau)$$
$$\quad \{S_r = S_4; N_r = N_4;\}$$
$$\{ELSE \ IF\} \ (N_2 > \tau)$$
$$\quad \{S_r = S_2; N_r = N_2;\}$$

$$\tilde{I} = \hat{I} + \frac{S_1 + S_r}{N_1 + N_2};$$

The threshold $\tau$ is normally set to 7. The value of $\tau$ should be proportional to the variance of prediction errors.

Sharpening of Conditional Error Probabilities

As described in Section 4.2, we use the error energy quantizer to form eight conditional error probabilities $p(\epsilon|Q(\Delta))$, $0 \leq Q(\Delta) < 8$, for entropy coding of $\epsilon$. Recall that the error energy quantizer Q is optimized in (6) to minimize the combined entropy of the eight conditional error probabilities. But $p(\epsilon|Q(\Delta))$ as is does not benefit from the error modeling based on the texture pattern B. For operational reasons, $p(\epsilon|Q(\Delta))$ rather than $p(\epsilon|C(\lfloor Q(\Delta)/2 \rfloor, B))$ are used in entropy coding of $\epsilon$, as the number of different compound contexts is too large.

However, on a second reflection, the conditional sample means $\bar{\epsilon}(\delta, \beta)$, which are dynamically computed for error feedback, can "sharpen" the conditional probabilities $p(\epsilon|Q(\Delta))$, or reduce their variances, as explained below, for free! We observed that under two different contexts $C(\delta, \beta_1)$ and $C(\delta, \beta_2)$, two conditional sample means $\bar{\epsilon}(\delta, \epsilon_1)$ and $\bar{\epsilon}(\delta, \beta_2)$ could be significantly off from zero and have opposite signs, reflecting very different $p(\epsilon|C(\delta, \beta_1))$ and $p(\epsilon|C(\delta, \beta_2))$. For a fixed $0 \leq \delta < 8$, one can then split the conditional probability $p(\epsilon|Q(\delta)=\delta)$ into two $$p_+(\epsilon|\delta) = \frac{\sum_\beta p(\epsilon | \bar{\epsilon}(\delta, \beta) \geq 0)}{\sum_\epsilon \sum_\beta (\epsilon | \bar{\epsilon}(\delta, \beta) \geq 0)} \quad (13)$$

$$p_-(\epsilon|\delta) = \frac{\sum_\beta p(\epsilon | \bar{\epsilon}(\delta, \beta) < 0)}{\sum_\epsilon \sum_\beta (\epsilon | \bar{\epsilon}(\delta, \beta) < 0)}$$

$p_+$ being the conditional probability of the errors $\epsilon$ in contexts $C(\delta, \epsilon)$ such that $\bar{\epsilon}(\delta, \beta) \geq 0$, and $p_-$ being such that $\bar{\epsilon}(\delta, \beta) < 0$. The two resulting conditional probabilities $p_+$ and $p_-$ will have smaller variances than $p(\epsilon|Q(\delta)=\delta)$, making more distinctive error statistics available to the entropy coder. Seemingly, this splitting of conditional probabilities for entropy coding would double the memory use. But a very simple technique can reap almost the same compression gain achievable by (13) without increasing the use of physical memory.

Figure 6:
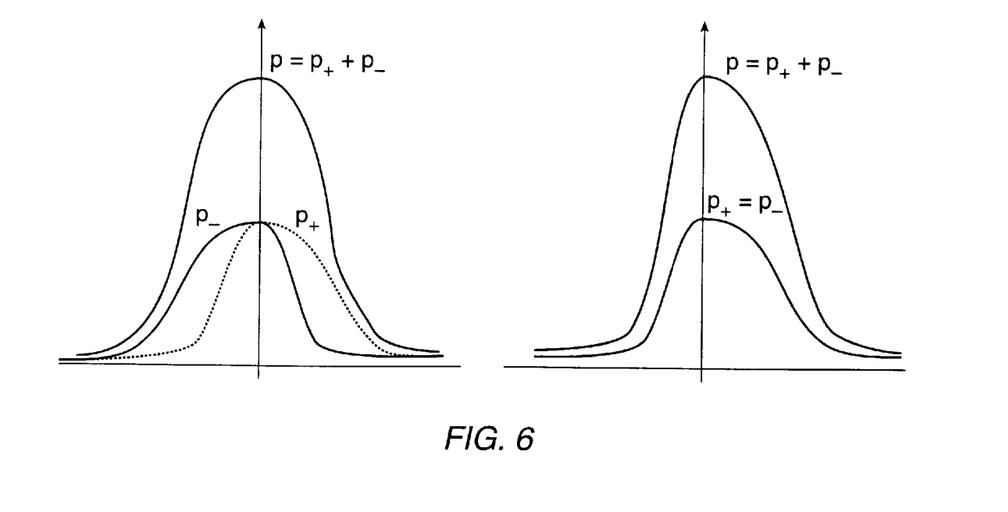
FIG. 6 is a two-part graph illustrating a sign flipping technique to sharpen conditional error probability density functions for entropy reduction without increasing modeling space.

The conditional probability $p(\epsilon|\delta)$ is the mixture of $p_+(\epsilon|\delta)$ and $p_-(\epsilon|\delta)$. We observed in our experiments that $p_+(\epsilon|\delta)$ and $p_-(\epsilon|\epsilon)$ are approximately mirror image of each other around the origin. Therefore, we can flip $p_-(\epsilon|\delta)$ around the origin and superimpose it onto $p_+(\epsilon|\delta)$ to create a more biased conditional probability for entropy coding:

$$\hat{p}(\epsilon|\delta) = p_+(\epsilon|\delta) + p_-(-\epsilon|\delta) \quad (14)$$

as illustrated in FIG. 6. Clearly, $\hat{p}(\epsilon|\delta)$ has a lower entropy than $p(\epsilon|\delta)$, and it can be used by an entropy coder to reduce bit rates without any extra space. Suppose that the current context is $C(\delta, \epsilon)$. Before encoding $\epsilon = I - \hat{I}$, the encoder checks whether $\bar{\epsilon}(\delta, \beta) < 0$. If yes, $-\epsilon$, otherwise, $\epsilon$ is encoded. Since the decoder also knows $C(\delta, \epsilon)$ and $\bar{\epsilon}(\delta, \beta)$, it can reverse the sign, if necessary, to reconstruct $\epsilon$.

This simple technique of sign flipping can reduce the bit rate by as much as three per cent on some test images. The improved coding efficiency is obtained, because the error modeling based on compound contexts $C(\delta, \beta)$ captures some of the statistical redundancy in the sign of $\epsilon$. In essence, by preserving or reversing the sign of $\epsilon$, we make a prediction on the sign of $\epsilon$. Thanks to context modeling the prediction is correct more than half of the time, yielding compression gains.

Binary Mode

The above adaptive, predictive coding scheme via context modeling of prediction errors is designed for compressing natural continuous-tone images. But the coder performance can be quite poor on images or subimages which contain very few grey levels, especially when compared with an algorithm based on explicit Markov modeling. The latter becomes feasible precisely because of the very small size of the symbol set. In this situation it is more effective to code pixel values directly rather than prediction errors.

In order to effectively compress uniform or nearly uniform image areas, graphics, rasterized documents, and any combination of natural images with one or more of these types, according to the invention there is a binary coder as a separate module of the compression system, and means are provided to select between modes. The system operates in two modes: continuous-tone and binary. Before I[i,j] is to be coded, a tester is invoked to for proper mode. It checks six neighboring pixels: ww, w, nw, n, ne, nn. If these six pixels have no more than two different values, the binary mode is triggered; otherwise the system is caused to enter the continuous-tone mode in which the predictor $\hat{I}$ and the compound contexts $C(\delta, \beta)$ are in use.

In the binary mode, let $s_1 = w$ and let the other value, if any, be $s_2 \$$. The encoder describes I[i,j] in one of the three states, using a ternary code T:

$$T = \begin{cases} 0 & \text{if } I[i, j] = s_1 \\ 1 & \text{if } I[i, j] = s_2 \\ 2 & \text{otherwise} \end{cases} \quad (1)$$

In the escape case of T=2, the encoder switches from the binary mode to the continuous-tone mode. This happens when the actual I[i,j] is found to violate the condition for binary mode. The escape case of T=2 can be called a "mode switch command".

Similar to the continuous-tone mode, upon entering the binary mode, the system considers a context of six events $$C = \begin{matrix} \{x_0, x_1, \ldots, x_5\} = \\ \{w, n, nw, ne, ww, nn\}, \end{matrix} \quad (2)$$

and quantize context $C = \{x_0, x_1, \ldots, x_5\}$ to a 6-bit binary number $B = b_5 \ b_4 / b_0$:

$$b_k = \begin{cases} 0 & \text{if } x_k = s_1 \\ 1 & \text{if } x_k = s_2 \end{cases}, \quad 0 \leq k < 6. \quad (3)$$

The binary number B represents a texture pattern around I[i,j]. Note that because $s_1 = w$, $b_0 = 0$ can be ignored from the texture encoding B. Thus there are only $2^5=32$ different prediction contexts in the binary mode. Consequently, we use 32 conditional probabilities p(T|B) to drive an adaptive arithmetic coder of three symbols. For the context modeling in the binary mode, only 32×3=96 frequency counts need to be maintained.

The incorporation of the binary mode into the compression system adds little to the system complexity, while greatly enhancing the coding performance on binary-type images, multimedia images, and images with large uniform areas. An important feature of our design is that the switch between continuous-tone and binary modes is context-dependent, automatic, and completely transparent to the user.

Variable Image Resolutions

All parameters and thresholds of the predictors and the context quantizers are designed and optimized for images of 8 bit resolution, because this is the most popular intensity resolution. However, we devised a very simple scaling mechanism for the coding system to handle images of all resolutions with ease, with negligible penalty on compression performance.

It is a design decision to scale $d_h$ and $d_v$ by some factor $\lambda$, if necessary, in order to make the prediction module and context modeling module invariant to intensity resolutions. This is because it is far more involved to adjust parameters and thresholds in the prediction and modeling modules for the best compression performance for different intensity resolutions.

Suppose that the input image has an intensity resolution of z bits, $1<z\leq 16$. The simplest scaling factor for $d_h$ and $d_v$ is $\lambda=2^{8-z}$. But in our experiments, we found that this simple scaling factor can incur quite heavy loss in coding efficiency if the input images are very smooth relatively to the dynamic intensity range.

To solve this problem, it is preferred that $d_h$ and $d_v$ be scaled according to the standard deviation $\sigma$ of the errors (the average of error magnitudes) in the previous row. Computationally, the value of $\sigma$ for the previous row is easy to update during the raster scan, requiring only an accumulator. Based on $\sigma$, we use an empirical formula $$\lambda = 2^{-\lfloor\frac{z-8}{2}\rfloor-\max(0,\lceil\log_2 \sigma-5\rceil)} \quad (18)$$

to compute the scaling factor for $d_h$ and $d_v$. Note that the scaling requires only binary shifting.

Progressive Transmission

Figure 7:
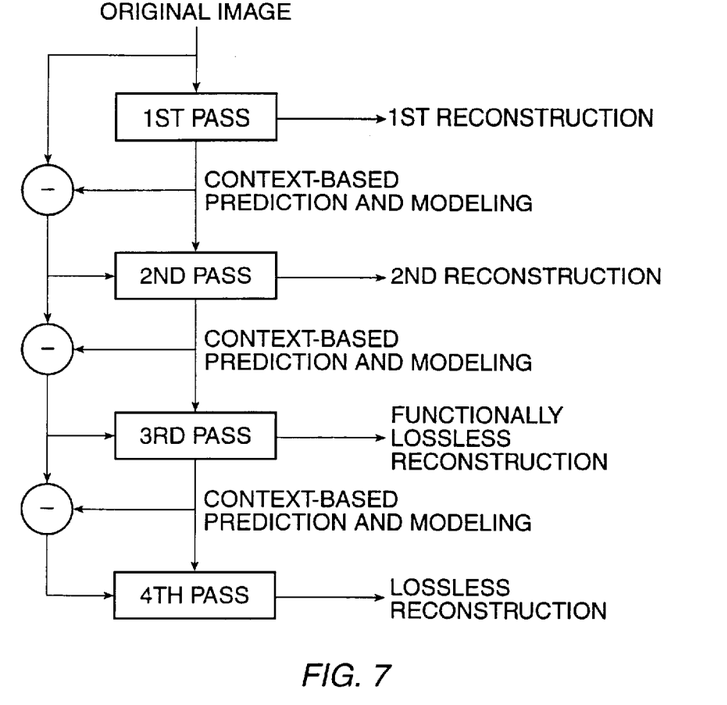
FIG. 7 is the block diagram of a four-pass encoding scheme for progressive transmission according to the invention.

To Achieve progressive transmission, the encoding, and accordingly the decoding, of an image is done in four passes as schematically described by FIG. 7. Each successive pass presents a better approximation of the original at a higher bit rate. The first pass obtains a compression ratio from 9:1 to 7:1 depending on images with an image quality that is comparable with lossy JPEG at the same compression ratio. The second pass presents a compressed image that is visually indistinguishable from the original at a compression ratio around 5:1. The third pass yields so-called functionally lossless compression at a compression ratio around 3:1. After the third pass, the errors are below such tight bounds in both magnitude and spatial distribution that their effects on most image processing and analysis functions are provably negligible. The fourth pass reaches true lossless compression by adding no more than 0.25 bits per pixel to the functionally lossless image from the third pass. The feature of progressive transmission is important for many applications such as remote query and retrieval in image databases, and in multiuse environment as described by U.S. Pat. No. 4,969,204 where different imaging devices of different resolutions access to the same image.

Unlike sequential encoding schemes, the multipass encoding of an image can generate completely enclosing prediction contexts.

Figure 8:
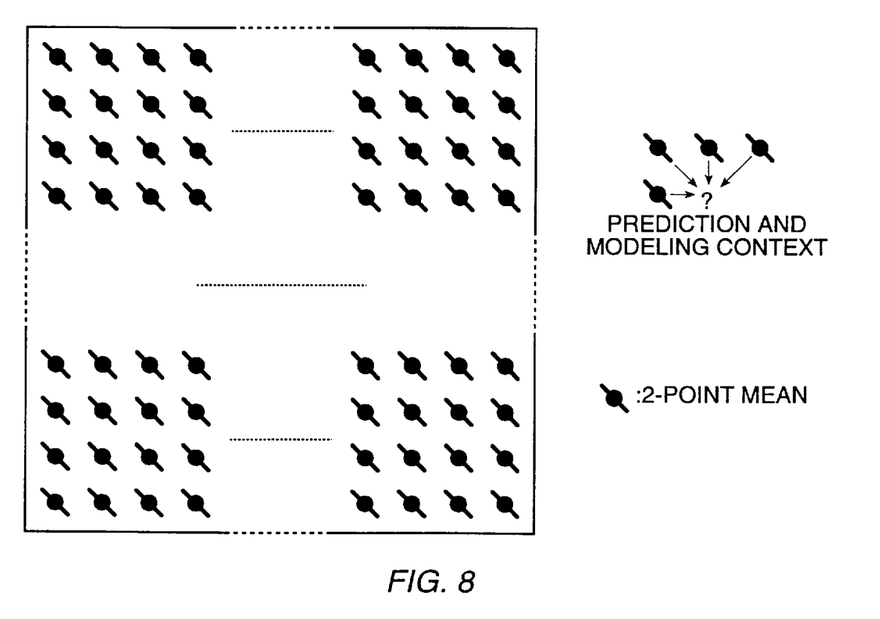
FIG. 8 is a diagram and key illustrating interlaced sampling for the first pass and the configuration of prediction and modeling context for such a pass.
Figure 9:
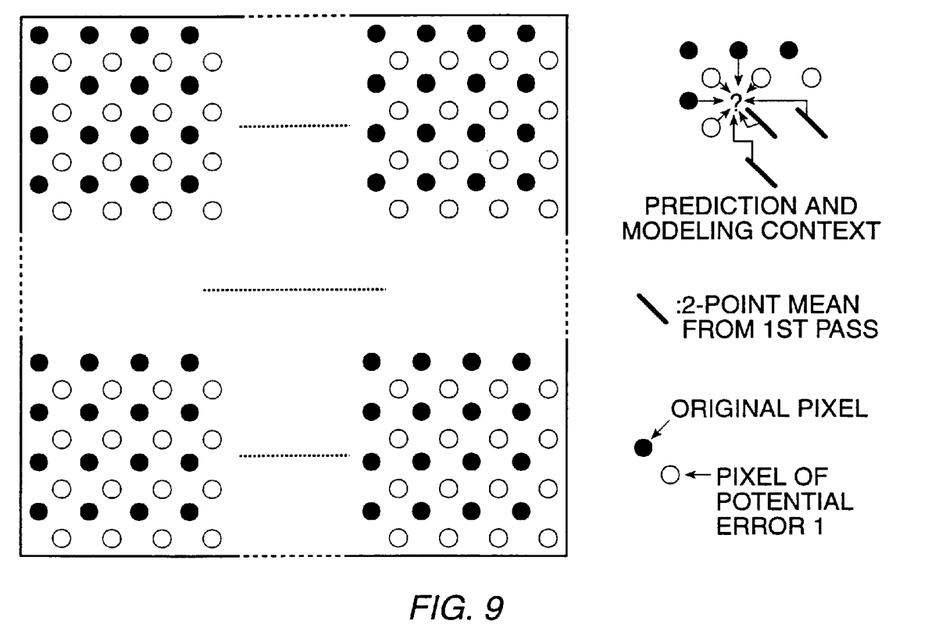
FIG. 9 is a diagram and key illustrating interlaced sampling for the second pass and the configuration of prediction and modeling context for such a pass.
Figure 10:
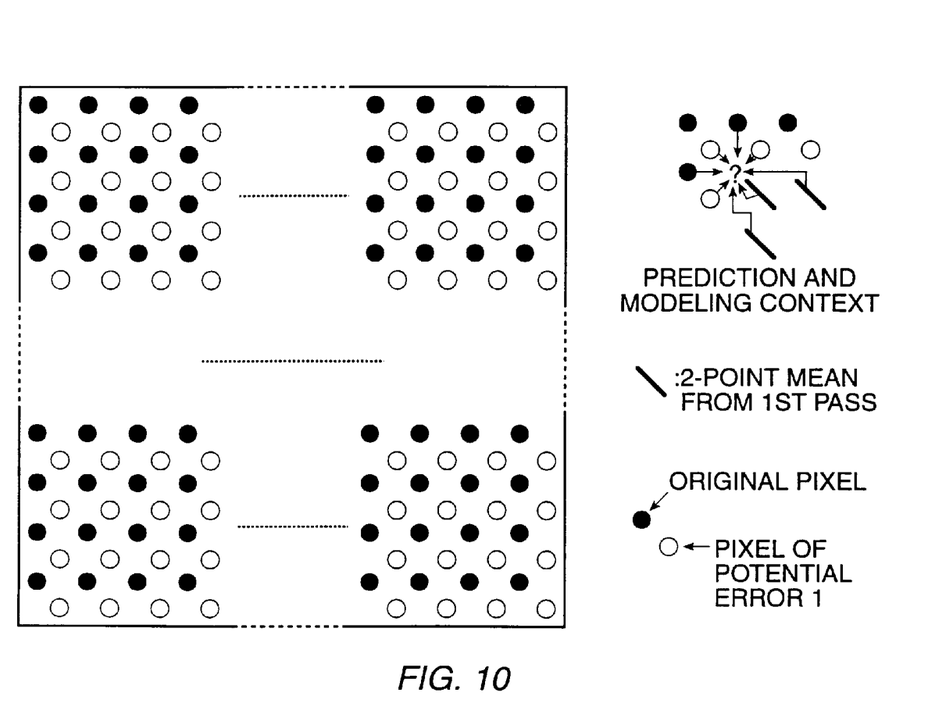
FIG. 10 is a diagram and key illustrating functionally lossless reconstruction at the third pass and the configuration of prediction and modeling context used in this pass.

Each of the four passes uses an interlaced sampling of the original image. FIG. 8 to FIG. 10 illustrate the patterns of the interlaced sampling from the first pass to the fourth pass respectively. Besides facilitating progressive transmission, the four-pass interlaced sampling scheme is also designed for the formation of modeling contexts that enclose the predicted pixels in all directions. The spatial configurations of the resulting modeling contexts in individual passes are also depicted in FIG. 8 through FIG. 10. Many image features such as intensity gradients, edge orientations, textures can be better modeled by enclosing contexts as those in FIG. 9 and FIG. 10 than by the contexts that only partially enclose the unknown pixel as in one-pass sequential coding.

The first pass encodes a subsampled W/2×H/2 image denoted by $I_1$, with the following relation between I and $I_1$ $$I_1[i,j] = \left\lfloor \frac{I[2i,2j]+I[2i+1,2j+1]}{2} \right\rfloor, \quad (19)$$
$$0 \leq i < W/2, \ 0 \leq j < H/2.$$

Note that $I_1[i,j]$ is not the average intensity of a 2×2 block but the average intensity of two diagonally-adjacent pixels. This subsampling is designed to benefit the context-based adaptive prediction in the subsequent passes. The W/2×H/2 image $I_1$ is encoded in the conventional raster scan sequence by the sequential CALIC algorithm as described in previous sections.

The second pass uses $I_1$ as the contexts to encode an W/2×H/2 array of 2-pixel blocks, called image $I_2$, where $$I_2[i,j]=(I[2i,2j],I[2i+1,2j+1]), \ 0\leq i<W/2, \ 0\leq j<H/2. \quad (20)$$

Note that $I_2[i,j]$ is a two-dimensional vector. Consequently, upon the completion of encoding $I_2$, half of original W×H pixels will be reconstructed. Again, the image $I_2$ is encoded in the conventional raster scan sequence. Since $I_1$ is by now available to both the encoder and decoder, it provides completely surrounding contexts for predicting and modeling I[2i,2j]. A possible context in this case is $$C=\{I_1[i,j], I_1[i+1,j], I_1[i,j+1], I[2i-1,2j+1], I[2i-1,2j-1], I[2i+1,2j-1], I[2i-2,2j], I[2i,2j-2]\} \quad (21)$$

See FIG. 9 for the spatial configuration of the context. Using the modeling contexts, the CALIC algorithm encodes the subsampled image $I_2$.

Once I[2i,2j] is reconstructed, the decoder can set $$I[2i+1,2j+1]=2I_1[i,j]-I[2i,2j] \quad (22)$$

without receiving any information on I[2i+1,2j+1]. But a consultation with (19) reveals that (22) can cause a rounding error of 1 if the sum I[i,j]+I[2i+1,2j+1] is an odd integer. The probability for this rounding error is 0.5. For the time being, this tiny, isolated error is tolerated. In FIGS. 9 and 10, the pixel with a probability 0.5 of being 1 smaller than the original value is marked by the unfilled circle.

The third pass encodes the remaining half of the original W×H image I; namely, pixels interlaced in the checker board pattern, I[2i+1,2j] and I[2i,2j+1], $0\leq i<W/2, 0\leq j<H/2$. In the third pass, the image is also encoded in the conventional raster scan order. After the intermediate images $I_1$ and $I_2$ are coded, the modeling contexts available to the third pass are the most complete and relevant to the predicted pixels. Hence much more compression of the remaining half of the image can be achieved. FIG. 10 illustrates the situation in the third pass and depicts a configuration of modeling context among many possibilities.

After the third pass, the image is said to be functionally lossless for the following reasons:

The error magnitude is bounded by 1.

The errors are spatially isolated. The errors can only occur at the positions marked by unfilled circles in FIG. 4. No consecutive errors can happen.

At the already isolated potential error positions, the errors are distributed randomly.

The errors have no effect on the average intensity in a window of any size.

The errors cannot alter the sign of the gradients of the original image function at any position or in any direction.

The effects of the errors on the filtering operations on the original image will be either nil or negligibly small. Given a filter kernel, the worst error impact on the filtering operation can be precisely computed to be a known prior.

If true lossless reconstruction is indeed required, the rounding errors of (22) can be corrected by one more pass.

Progressive, multiresolution decompression is a natural product of the above four-pass encoding scheme. By choosing $I_1$, $I_2$, and then functionally lossless I or true lossless I, the decoder obtains a reconstruction at a desired resolution and bit rate.

Entropy Coding of Prediction Errors

An advantage of this invention is the clean separation between context-based prediction and modeling of image data and entropy coding of prediction errors. Any entropy coder, be it Huffman or arithmetic, static or adaptive, binary or m-ary, can be easily interfaced with the CALIC system. The system should be made flexible enough to accommodate all entropy coding methods that are known to date. If system complexity and cost are of primary concern, static global Huffman coders can be used. On the other hand, for best compression possible, adaptive arithmetic coders will be the choice.

Decompression

The decompression or decoding process of the CALIC system is a straightforward reverse of the encoding process whose details were just explained. The decoding process reconstructs the original image in the same order as the image was encoded by the CALIC system. The decoding system selects either sequential or progressive decompression, depending on whether the image is compressed sequentially or progressively. Referring to FIG. 1, the CALIC decoding process automatically enters one of the binary or continuous-tone decompression modes, based on the exactly same context-sensitive decision that is made by the encoder. Thus the encoder and decoder can synchronize with each other without using any side information.

In the binary mode, a context-based adaptive entropy coder that is identical to the one used in the encoding process is used to decode the current symbol.

In the continuous-tone mode, the gradient-adjusted prediction, denoted $\dot{I}$, of I is made exactly in the same manner as the encoder, and the predictor $\dot{I}$ is further improved by the same context-sensitive error feedback technique that is used in the encoding process. Since predictions for the current pixel that are made by the encoder are based solely on the pixels that have already been encoded, the decoder can perform the same predictions, context formation, context selection, context quantization, error feedback and entropy coding context determination. The decoder can then uniquely decode the prediction error from the compressed bit stream and add it to the prediction in order to reconstruct the exact original value of the current pixel. The decoder proceeds in this manner and recovers the original image pixel by pixel from the prediction errors that it decodes one at a time from the compressed bit stream.

The invention has now been explained with reference to specific embodiments. Other embodiments will be apparent to those of ordinary skill in the art. Therefore, it is not intended that this invention be limited, except as indicated by the appended claims.

What is claimed is:

1. A method for lossless image data compression comprising the steps of:

dynamically and automatically choosing between a binary level compression mode and a continuous-tone level compression mode for each current image element based on local context of said current image element; thereafter in said binary mode, compressing a ternary coded signal consisting of binary image data or a mode switch command by context-based, adaptive ternary entropy encoding, storing first results in a memory as a first compressed portion of the image data and switching to said continuous-tone level compression mode if said ternary coded signal consists of said mode switch command;

compressing continuous-tone level image data of said current image element, in said continuous-tone mode, by context-based, adaptive, non-linear predictive entropy encoding and storing second results in said memory as a second compressed portion of the image data;

wherein said binary mode entropy encoding is a first selected context-sensitive entropy-encoding process; and wherein said continuous-tone mode entropy encoding is a second selected context-sensitive entropy-encoding process wherein prediction error is entropy encoded.

2. The method according to claim 1 wherein first selected specific compression techniques are used for sequential transmission of said first compressed portion and said second compressed portion of the image data.

3. The method according to claim 1 wherein second selected specific compression techniques are used for progressive transmission of said first compressed portion and said second compressed portion of the image data.

4. The method according to claim 3 further comprising subsampling images in four passes; and forming from subsampling data enclosing contexts in the form of causal templates.

5. The method according to claim 1 wherein said current image element is a pixel, and wherein in said continuous-tone mode compressing step comprises predicting values for each said pixel based on local intensity gradient estimates.

6. The method according to claim 5 wherein said predicting step further includes estimating energy of prediction errors based on both local gradient and prediction errors of preceding pixels together to obtain an error energy estimator.

7. The method according to claim 5 wherein said continuous-tone mode entropy encoding further includes estimating energy of prediction errors based on both local gradient and prediction errors of preceding pixels together.

8. The method according to claim 7 further including reversing sign of a prediction error to sharpen the conditional error probability densities for entropy coding.

9. The method according to claim 7 further including adaptive bit shifting in each encoding context in order to scale $d_h$ and $d_v$, where $d_h$ and $d_v$ are estimates, within a scaling factor, of gradients of the intensity function near pixel I[i,j] in horizontal and vertical directions, such that encoding schemes are independent of intensity resolutions.

10. The method according to claim 6 further including quantizing the error energy estimator to form conditioning classes for entropy encoding in the continuous-tone mode.

11. The method according to claim 5, further including forming modeling contexts by causal templates using a prediction value of a pixel.

12. The method according to claim 11, further including quantizing the modeling contexts, wherein said quantizing of the modeling contexts comprises binarization of spatial texture patters.

13. The method according to claim 5, further including selecting an optimal modeling context in a context hierarchy.

14. The method according to claim 5 further including combining a quantized texture pattern and a quantized error energy estimator into a compound context for modeling prediction errors.

15. The method according to claim 5 further including using conditional expectations of the prediction errors to model errors at low model cost and low computational cost.

16. The method according to claim 5 further including reducing weight of past statistics in adapting to non-stationary image data.

17. The method according to claim 5 further including correcting prediction via context modeling of prediction errors and error feedback.

18. The method according to claim 1 wherein said choosing step comprises selecting between said binary level compression mode and said continuous-tone level compression mode based on local context information only and without use of side information.

19. The method according to claim 1 wherein said binary mode compressing step comprises forming a modeling context for adaptive binary entropy encoding.

20. A method for lossless image data compression comprising the steps of:
dynamically and automatically choosing between a binary level compression mode and a continuous-tone level compression mode for each current image element based on local context of said current image element, said current image element being a pixel; thereafter,
in said binary mode, compressing a ternary coded signal consisting of binary image data or a mode switch command by context-based, adaptive ternary entropy encoding, storing first results in a memory as a first compressed portion of the image data and switching to said continuous-tone level compression mode if said ternary coded signal consists of said mode switch command;
compressing continuous-tone level image data of said current image element, in said continuous-tone mode, by context-based, adaptive, non-linear predictive entropy encoding and storing second results in said memory as a second compressed portion of the image data;
wherein said binary mode entropy encoding is a first selected context-sensitive entropy-encoding process; and
wherein said continuous-tone mode entropy encoding is a second selected context-sensitive entropy-encoding process wherein prediction error is entropy encoded;
wherein said continuous-tone mode compressing step further includes:
predicting values for each said pixel based on local intensity gradient estimates, including estimating energy of prediction errors based on both local gradient and prediction errors of preceding pixels together to obtain an error energy estimator;
forming modeling contexts by causal templates using a prediction value of a pixel;
selecting an optimal modeling context in a context hierarchy;
combining a quantized texture pattern and a quantized error energy estimator into a compound context for modeling prediction errors;
using conditional expectations of the prediction errors to model errors at low model cost and computational cost;
correcting prediction via context modeling of prediction errors and error feedback; and
wherein said continuous-tone mode entropy encoding further includes:
estimating energy of prediction errors based on both local gradient and prediction errors of preceding pixels together;
quantizing the error energy estimator to form conditioning classes for entropy encoding in the continuous-tone mode; and
reversing sign of a prediction error to sharpen the conditional error probability densities for entropy encoding.

21. A system for lossless image data compression comprising:
a first subsystem for dynamically and automatically choosing between a binary level compression mode and a continuous-tone level compression mode for each current image element of an input image based on local context of said current image element, including a values predictor operative on each said image element wherein prediction is based on local intensity gradient estimates;
a second subsystem for compressing, in said binary mode, ternary data consisting of binary image data of said current image element or a mode switch command by context-based, adaptive, ternary entropy encoding as a first compressed portion of the image data and switching to said continuous-tone level compression mode if said ternary data consists of said mode switch command; and
a third subsystem for compressing, in said continuous-tone mode, the image data of said current image element by context-based, adaptive, non-linear predictive entropy encoding as entropy-encoded prediction errors of a second portion of the image.

22. A method for lossless image data decompression comprising the steps of:
dynamically and automatically choosing between image data compressed by a binary level compression and image data compressed by continuous-tone level compression for each current image element based on local context of said current image element; thereafter either decompressing, in said binary mode, image data of said current image element consisting of binary image data or a mode switch command by context-based, adaptive, ternary entropy decoding to produce a first decompressed portion of the image data and switching to said image data compressed by continuous-tone level compression if said image data consists of said mode switch command; and decompressing, in said continuous-tone mode, the image data of said current image element by context-based, adaptive, non-linear predictive entropy decoding as a second decompressed portion of the image; and directing the first decompressed portion and the second decompressed portion to an output utilization device to produce a binary level and continuous-tone level composite image.

23. A method for substantially lossless image data compression comprising the steps of:

dynamically and automatically choosing between a binary level compression mode and a continuous-tone level compression mode for each current image element based on local context of said current image element; thereafter in said binary mode, compressing ternary data consisting of binary image data of said current image element or a mode switch command by functionally-lossless context-based, adaptive, ternary entropy encoding, storing first results in a memory as a first compressed portion of the image data, such that errors in a decompressed version of said image data do not exceed 1 and never occur consecutively in image space and switching to said continuous-tone level compression mode if said ternary data consists of said mode switch command;

compressing continuous-tone level image data of said current image element, in said continuous-tone mode, by functionally-lossless context-based, adaptive, non-linear predictive entropy encoding and storing second results in said memory as a second compressed portion of the image data, such that errors in a decompressed version of said image data do not exceed 1 and never occur consecutively in image space;

wherein said binary mode entropy encoding is a first selected context-sensitive entropy-encoding process; and wherein said continuous-tone mode entropy encoding is a second selected context-sensitive entropy-encoding process wherein prediction error is entropy encoded.

* * * * *